United States Patent Office 3,705,045
Patented Dec. 5, 1972

3,705,045
INK MARKING COMPOSITIONS
Francis Joseph Nadolski, Piscataway, N.J., assignor to American Cyanamid Company, Stamford, Conn.
No Drawing. Filed Nov. 12, 1970, Ser. No. 89,066
Int. Cl. C09d 11/00
U.S. Cl. 106—22                                    8 Claims

ABSTRACT OF THE DISCLOSURE

An ink marking composition, prepared by adding a hot solution of an acid dye of the triarylmethane or azo class in a specific class of glycols which include di-, tri- and tetraethylene glycols and propylene and hexylene glycols, to a hot solution of a basic dye of the di- or tri-arylmethane class in water, and cooling, is non-drying, bleedfast, and suitable for use in fiber pens, felt and wick markers, stamp pads and meter and recording equipment.

---

The present invention relates to organic-dye-containing ink marking compositions useful in nib-type pens, felt and wick markers, stamp pads and recording pens for meters and instruments and to methods for their preparation. More particularly, this invention relates to aqueous solvent compositions of particular acid-basic dye solution mixtures having the desirable features of remaining moist and serviceable when exposed to the atmosphere for long periods of time, and producing, on marking, a bleed-fast mark of adequate lightfastness.

Heretofore, a common practice has been to employ water as the solvent vehicle in inks. Such inks have the serious drawback of tending to dry out on the nib of a fiber pen, or in the pores of a felt or wick marker, preventing the further passage of the ink.

In order to improve on such inks, various attempts have been made to substitute organic vehicles for the water solvent. Inks with organic vehicles have generally shown good drying properties on paper. However, they frequently exhibit a very undesirable property, namely, they show a high paper penetrating ability which causes staining or bleeding and strike-through onto the back of the paper.

Aqueous glycerin solutions have been used in the past as a vehicle for ink compositions. However, there is a tendency for such compositions to be greasy, viscous, heavy and slow drying.

Service requirements for inks employed in instruments, meters and recorders call for fast drying solvents on the one hand, whereas on the other hand, they require a solvent which will withstand considerable exposure to the atmosphere in recorder-pen fountains without clogging or thickening. Generally, ink is supplied to such fountains in amounts sufficient to last for several days and such pens are expected to perform without failure or clogging irrespective of humidity, temperature or other adverse atmospheric conditions. The ink traces obtained are also expected to be of a uniform width and color no matter how rapidly the pen moves or how long the pen may stay in a given position.

Therefore, a need arises for a marking ink having a suitable solvent system which lacks these undesirable characteristics and which at the same time is both stable and compatible with the dyes being used. Factors to be considered in the selection of such a solvent system require the proper balance of such diverse properties in an ink system as a suitable viscosity providing maximum flowability in writing or recording speeds, maximum solubility of the various dyes used, a low enough vapor pressure to enable the pen-nib or felt marker to remain moist with intermittent use, especially when the pin-nib is uncapped. At the same time, the solvent system should be readily absorbed and evaporated through the interstices of the paper web.

The selection of the proper colorant for the ink compositions of the present invention must also satisfy several important demands. Pigments may not be employed inasmuch as they are insoluble and tend to clog the fine capillaries of recording pens for instruments and meters. The compositions of the invention, therefore, use soluble dyes.

Such dyes, however, must have adequate lightfastness in order that a record made therefrom does not fade if left exposed for long stretches of time. Also, they must be capable of being incorporated in sufficient concentration to produce a strong, legible line or mark. Finally, the dye or dye mixture must be soluble in, compatible with and stable in the particular solvent system selected.

Solutions of acid dyes in water, in glycol, or in an aqueous glycol solution, either alone or in combination with other acid dyes, tend to dry out on pen-nibs, stamp pads or felt markers. Such markings also tend to bleed and wash off.

Solutions of basic dyes alone in water or in aqueous solvent mixture with glycols also tend to dry out. Markings made from such compositions have poor light-fastness.

Furthermore, acid and basic dyes are generally incompatible when mixed inasmuch as they usually result in the formation of coprecipitates of acid-basic dye complexes.

Accordingly, it is an object of the present invention to provide novel ink marking compositions possessing superior characteristics to those heretofore provided.

Another object of this invention is to provide ink marking compositions having certain desirable properties which make them particularly useful for nib-type pens, felt and wick markers, stamp pads and for use with meter and instrument recording pens.

Still another object of the present invention is to provide a method of preparing such ink marking compositions.

In accordance with the present invention, an improvement in ink marking compositions is obtained by the preparation and combination, in a given order, of specific solutions of acid and basic dyes. Thus, it has now been found that when a hot solution of one or more acid dyes of the sulfonated triarylmethane or sulfonated azo class, in a glycol solvent which has a vapor pressure no greater than 0.1 mm. Hg at 20° C. and a viscosity of more than 30 and less than 65 centipoises at 20° C., is added gradually to a rapidly stirring hot solution in water of one or more basic dyes of the di- or tri-arylmethane class in the form of their salts, a clear solution results which on cooling to ambient temperature gives a stable non-drying ink composition, which, on marking, gives a bleed-fast mark of improved lightfastness.

The acid and basic dyes used in the present invention are all well known. Their structures are given in the Colour Index Vol. 3, 1957 and K. Venkataraman, The Chemistry of Synthetic Dyes, New York, 1952, chapters XII and XXIII. The acid dyes of the present invention are readily soluble in polyhydroxy solvents. Most of the basic dyes have only a limited solubility in such solvents but are readily soluble in water.

ACID DYES

As aforeindicated, the acid dyes suitable for the practice of this invention are sulfonated triarylmethane and sulfonated monoazo dyes. The triarylmethane dyes contain two or three sulfonic acid groups, one being in zwitterion formation with the quaternized ammonium, the residual sulfo group(s) being in the form of an alkali salt(s). The azo dyes are monoazo dyes containing 1 to 3 sulfonic acid groups, each in the form of an alkali salt.

These azo dyes are of the arylazoaryl and arylazopyrazolone classes.

Acid triarylmethane dyes preferred for the practice of the invention conform to the formula:

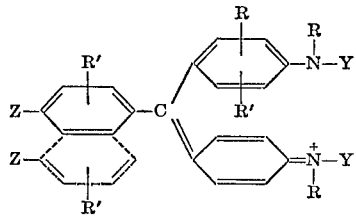

Formula I wherein R is hydrogen or lower alkyl; R' is hydrogen, chloro or X; X is a sulfo group, the cation of which is an alkali ion when not in the zwitterion with

Y is selected from the group consisting of hydrogen, lower alkyl, —CH₂—C₆H₅, —CH₂—C₆H₄—X and —C₆H₄—X; Z is hydrogen, X, lower alkylamino, lower dialkylamino, —NH—C₆H₄—X,

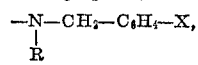

—NH—C₆H₄—NH₂, —NH—C₆H₄—NH₂ or

—NH—C₆H₄—OC₂H₅ provided that there are at least two and not more than three X's in the dye molecule; the dotted line completing a naphthalene moiety when present in the dye.

Acid monoazo dyes preferred for the practice of this invention conform to the formula:

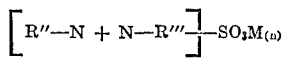

Formula II wherein R'' is a phenyl, 1-naphthyl or 2-naphthyl radical having at least one substituent of the group hydrogen, nitro and SO₃M; R''' is a 1-naphthyl or a 2-naphthyl radical having a hydroxy or an amino group in ortho position of attachment to the azo bridge, or a 1-phenyl-2-pyrazolinyl-5-one radical which has at least one further substituent in the 1-phenyl nucleus thereof selected from the group amino, chloro, hydroxy and SO₃M and a carboethoxy or lower alkyl in the 3-position; M is a cation of the alkali series and n is 1 to 3.

Examples of the preferred acid dyes of Formulas I and II and their identifying Colour Index numbers are as follows:

Acid Blue 7 _____ (C.I. 42080)
Acid Blue 22 _____ (C.I. 42755)
Acid Blue 34 _____ (C.I. 42561)
Acid Blue 83 _____ (C.I. 42660)
Acid Blue 93 _____ (C.I. 42780)
Acid Blue 104 _____ (C.I. 42735)
Acid Green 3 _____ (C.I. 42085)
Acid Green 9 _____ (C.I. 42100)
Acid Green 16 _____ (C.I. 44025)
Acid Red 14 _____ (C.I. 14720)
Acid Red 18 _____ (C.I. 16255)
Acid Violet 1 _____ (C.I. 17025)
Acid Violet 16 _____ (C.I. 42640)
Acid Violet 49 _____ (C.I. 42640)
Acid Yellow 34 _____ (C.I. 18890)

All of these acid dyes are soluble in amounts up to 10 grams of dye per 100 cc. of the glycol of this invention. The acid dye "glycol" solution will contain from about 3 to about 10% by weight, preferably from about 3-4%, of acid dye. An acid dye may be dissolved at temperatures of from 165-185° F., 170-180° F. being preferred. Mixtures of these dyes may be also used in the practice of this invention.

BASIC DYES

The basic dyes suitable for the practice of this invention are those of the triarylmethane and diarylmethane classes which are in the form of their salts.

Basic triarylmethane dyes preferred for the practice of this invention conform to the formula:

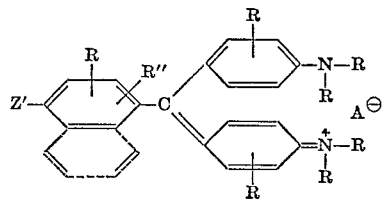

Formula III wherein R is hydrogen or lower alkyl; R'' is hydrogen or chloro; Z' is hydrogen, amino, lower alkylamino, lower dialkylamino or anilino; and A⁻ is an anion of a strong acid such as halide or hydrosulfate; the dotted line representing the completion of a naphthalene ring when present in the dye molecule.

Basic diarylmethane dyes preferred for the practice of this invention conform to the formula:

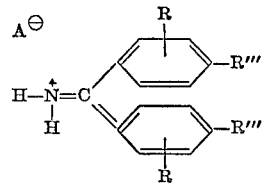

Formula IV wherein R is hydrogen or lower alkyl; R''' is selected from lower alkylamino and lower dialkylamino and A⁻ is an anion of a strong acid such as halide or hydrosulfate.

Examples of the preferred basic dyes of Formulas III and IV and their identifying Colour Index numbers are as follows:

Basic Blue 5 _____ (C.I. 42140)
Basic Blue 7 _____ (C.I. 42595)
Basic Blue 26 _____ (C.I. 44045)
Basic Green 1 _____ (C.I. 42040)
Basic Red 9 _____ (C.I. 42500)
Basic Violet 1 _____ (C.I. 42535)
Basic Violet 2 _____ (C.I. 42520)
Basic Violet 3 _____ (C.I. 42555)
Basic Violet 4 _____ (C.I. 42600)
Basic Yellow 2 _____ (C.I. 41000)
Basic Yellow 37 _____ (C.I. 41001)

The basic dyes are dissolved in water at concentrations ranging from 1.5% to 7%, preferably 3 to 5%. Triarylmethane dyes are dissolved at temperatures of from 170° F. to near the boiling point of water. Diarylmethane dyes are best kept to 100–160° F. and preferably 120–140° F. to effect solution, although short periods of time at the boil are operable. Mixtures of these dyes may be used in the practice of this invention.

The two "hot" solutions (i.e., of the acid and basic dyes, respectively) are combined in such proportions that the resulting ink compositions contain from about 15 to about 85% water, based on the total of water and glycol therein. The ink compositions will thus also contain from about 0.1% to about 5% of the acid dye and from about 0.1% to about 5% of the basic dye.

It is essential to the formation of the ink compositions of the invention that the glycol solution of the acid dye be gradually added, with stirring, to the water solution of the basic dye. Thus, if the order of addition is reversed or if the glycol solution is added too fast, the acid-basic dye complex will precipitate out due to the fact that while they are soluble in water the basic dyes are not appreciably soluble in glycols.

Other classes of dyestuffs have been found not to be suitable for the practice of this invention since they show either too great or too slight a solubility in the solvent vehicle, or markings are not light-fast, or tend to bleed and wash out. Examples of unacceptable dye classes are the azine, triazine, xanthene and rhodamine classes of dyes.

Glycols suitable for the practice of this invention are those which combine two properties, i.e., (1) they have a vapor pressure no greater than 0.1 mm. Hg at 20° C. and (2) they have a viscosity of more than 30 and less than 65 centipoises at 20° C. These include diethylene glycol, triethylene glycol, tetraethylene glycol, hexylene glycol and propylene glycol.

The vapor pressure of the solvent vehicle determines the rate at which the solvent is to be evaporated from the paper web once it has been absorbed. At the same time the vapor pressure is a factor in the rate of evaporation from a pen-nib, or felt marker or stamp pad which has been left exposed to the atmosphere.

Glycols with viscosities below 30 centipoises at 20° C. are unsuitable for use in the present invention. Such glycols include ethylene glycol and many of the glycol ethers as, for example, the ethyl ether of glycol, the ethyl ether of ethylene glycol and the higher monoethers of n-hexylglycol. Ink compositions prepared using these solvents are too thin to be used for marking. Furthermore, they cannot be used in solutions having water to glycol ratios of 85 to 15 due to the tendency of uncapped nibs or markers exposed to the atmosphere to dry out. Also, many of the acid dyes are not sufficiently soluble in such glycols.

Glycols having a viscosity greater than 65 centipoises at 20° C. are also unsuitable for use in the present invention. Such solvents include dipropylene glycol, 1,4-butanediol, 2,3-butanediol and 1,5-pentanediol. These solvents tend to be immiscible with water and present solubility problems in solubilizing the acid dye or on mixing acid dye solutions of such glycols with aqueous basic dye solutions.

The gradual addition of a hot glycol solution of the acid dye with vigorous stirring to a hot water solution of the basic dye results in a transparent solution which is stable and which remains clear even on cooling and long standing.

This stable, homogeneous and clear solution is the ink marking composition of this invention.

Such ink compositions are especially advantageous in fiber nib markers where the nib of the pen is uncapped or exposed to the atmosphere for long periods of time. Nibs of these pens are generally made of nylon, polyester, acrylic, fluorocarbon or other synthetic material. Markings made on paper by means of these pen-nibs using the ink compositions described herein quickly dry to give markings which are non-smearing, non-bleeding, waterproof and of an improved fastness to light. The ink compositions of the present invention are also extremely useful because of their non-evaporating qualities in wick or felt type markers, having a relatively large porous surface area from which evaporation readily takes place. In addition to nib and marker pens these ink compositions are also useful in non-drying stamp pads which have a large surface area and which are frequently left exposed to the atmosphere for long periods of time.

The ink compositions of the present invention are also useful as meter and recording inks for systems which require the desirable surface tension and non-drying characteristics of my inks. Finally, the inks of the present invention also serve as stains for cellulosic and acrylic plastics, rubber and other materials.

To more particularly point to the inventive features, reference is made to the following examples. These examples illustrate methods of preparation of, and the performance of, such ink marking composition of this invention.

EXAMPLE 1

Green, blue and violet ink compositions

Group A.—Stock solutions of each of the following acid dyes were prepared by adding 10 g. of the dye to 100 cc. diethylene glycol at 170–180° F.

(1) Acid Green 3, C.I. 42085
(2) Acid Blue 104, C.I. 42735
(3) Acid Blue 22, C.I. 42755
(4) Acid Violet 49, C.I. 42640

Group B.—Stock solutions of the following basic dyes were prepared by adding 3 g. of the dye to 100 cc. water at 200° F.

(1) Basic Green 1, C.I. 42040
(2) Basic Blue 7, C.I. 42595
(3) Basic Blue 26, C.I. 44045
(4) Basic Violet 3, C.I. 42555

To 15 cc. of each of the stock solutions of Group A, 35 cc. of diethylene glycol was added and the whole heated to 170–180° F. Each of the hot glycol solutions thus prepared from stock solutions (1), (2), (3) and (4), respectively, of Group A, were then added gradually to 50 cc. of each of the hot water solutions (1), (2), (3) and (4), respectively, of Group B. In each case, a clear solution was obtained which remained clear on cooling to room temperature. Each of the solutions, containing a 50/50 proportion of diethylene glycol to water and both acid and basic dyes, were tested as ink compositions. The ink was drawn down on paper with a drawdown knife. On drying, the paper was immersed in water. There was little or no bleeding of the colored ink. At the end of one hour at ambient temperature, no more bleeding had taken place.

Marker pens with polyester nibs were filled with three of the ink compositions, viz, (1) containing Acid Green 3 and Basic Green 1, (2) containing Acid Blue 104 and Basic Blue 7 and (3) containing Acid Blue 22 and Basic Blue 26. Also, a marker pen having a fluorocarbon nib was filled with composition (4) containing Acid Violet 49 and Basic Violet 3. Markings were made on paper using these pens. The markings showed negligible bleed in water. Additionally, the pens were left uncapped with the nibs pointed up for a period of three months. The ink compositions on the nibs remained moist and appeared normal with no caking or precipitation of the dyes taking place. The markings made on paper showed negligible bleeding, and good light-fastness, holding up to ten hours in a Fadeometer before showing slight fade.

EXAMPLE 2

Red ink composition

Solution A.—One gram of Acid Yellow 34, C.I. 18890, was dissolved in 100 cc. diethylene glycol at 170–180° F. This solution was combined with a solution of 1 g. C.I. Basic Yellow 37, C.I. 41001, dissolved in 100 cc. diethylene glycol at 170–180° F. The resultant solution mixture was called "Solution A."

Solution B.—To 100 cc. water was added 0.67 g. C.I. Basic Red 9, C.I. 42500, a magneta. The whole was heated to 170–180° F. giving "Solution B."

To 50 cc. Solution B, there was gradually added, with stirring, 50 cc. of Solution A, each solution being at the preparational temperature thereof. The whole was stirred and allowed to cool. A clear red ink composition resulted. A drawdown of this ink composition on paper had a negligible bleed in water. It was also non-drying in a pen whose polyester nib was exposed to the atmosphere for 67 days.

EXAMPLE 3

Yellow ink composition

To 100 cc. of boiling water was added, with stirring, 100 cc. of Solution A of Example 2 at 170–180° F. The solution was heated to the boil and allowed to cool, resulting in a clear yellow ink composition.

Draw-down showed a negligible bleed in water. A pen filled with this yellow ink compositon, having an uncovered polyester nib, was not dried-out when inspected after 82 days. The ink composition itself showed no sediment or separation at the end of this period.

Alternately, a similar yellow ink composition was obtained by adding 100 cc. of a 1% solution of Acid Yellow 34 in diethylene glycol (prepared at 170–180° F. and cooled to 120–140° F.) with stirring to 100 cc. of a 1% solution of Basic Yellow 37 in water at 120–140° F., the whole then being cooled to ambient temperature.

EXAMPLE 4

Red ink composition.—Glycol to water ratio 15 to 85

Solution A.—Stock solution was prepared by dissolving 5 g. C.I. Acid Yellow 34, C.I. 18890, in 100 cc. diethylene glycol at 170° F.

Solution B.—A stock solution was prepared by dissolving 5 g. C.I. Basic Red 9, C.I. 42500, in 100 cc. boiling water.

To 70 cc. water was added 15 cc. Solution B, making a total of 85 cc. of an aqueous solution. To this was added at the boiling temperature, with stirring, 15 cc. of Solution A. On cooling, the red ink remained clear and stable.

When this solution was placed in a marking pen having an acrylic nib and left uncapped three months, the ink composition was found to be non-drying.

EXAMPLE 5

Black ink composition

Four stock solutions were prepared I, II, III and IV as follows:

(I) A solution of 5 g. C.I. Acid Violet 49, C.I. 42640, in 100 cc. diethylene glycol at 170° F.
(II) A solution of 5 g. C.I. Basic Yellow 37, C.I. 41001, in 100 cc. diethylene glycol at 170° F.
(III) A solution of 5 g. C.I. Basic Violet 1, C.I. 42535, in 100 cc. boiling water.
(IV) A solution of 5 g. C.I. Acid Yellow 34, C.I. 18890, in 100 cc. diethylene glycol at 170° F.

Fifty (50) cc. portions of the above solutions were combined at the said preparational temperatures in the following manner: Solutions I and IV were combined. Solution III was added to Solution II and diluted with 100 cc. boiling water. The first mixture of Solutions I and IV was then gradually added to the second mixture of Solutions II and III with vigorous stirring. The resulting composition was an excellent black ink.

On a draw-down suspended in water very little bleeding was shown to occur. When placed in a marking pen having an acrylic nib and left uncapped to the atmosphere, the nib remained moist and wrote well even after 61 days.

I claim:
1. An ink marking composition consisting essentially of:
   (a) from 0.1 to about 5.0% of an acid dye selected from the group consisting of a sulfonated triarylmethane and a sulfonated azo dye;
   (b) from 0.1 to about 5.0% of a basic dye selected from the group consisting of a diarylmethane and a triarylmethane dye in the form of its salt;
   (c) from 15.0 to about 85.0% of a glycol having a vapor pressure no greater than 0.1 mm. Hg at 20° C. and a viscosity of more than 30 and less than 65 centipoises at 20° C.; and
   (d) from 15.0 to about 85.0% of water; said percentages of (c) and (d) being inverse one to the other and totalling 100%.

2. An ink marking composition according to claim 1 wherein the glycol is selected from the group consisting of diethylene glycol, triethylene glycol, tetraethylene glycol, hexylene glycol and propylene glycol.

3. An ink marking composition according to claim 1 in which the acid dye is a triarylmethane dye, the basic dye is a triarylmethane dye and the glycol solvent is diethylene glycol.

4. An ink marking composition according to claim 1 wherein the acid dye is a monoazo dye, the basic dye is a diarylmethane dye and the glycol solvent is diethylene glycol.

5. A method of preparing an ink marking composition which comprises: (1) forming a 3 to 10% solution of an acid dye selected from the group consisting of a sulfonated triarylmethane and a sulfonated monoazo dye in a glycol selected from the group consisting of diethylene glycol, triethylene glycol, tetraethylene glycol, hexylene glycol and propylene glycol by heating the dye and the glycol together at a temperature of 165–185° F., (2) forming a 1.5 to 7% solution in water of a basic dye selected from the group consisting of a diarylmethane and a triarylmethane dye in the form of its salt by heating the dye salt and water together at a temperature of 100–212° F., (3) gradually adding the heated acid dye solution to the heated basic dye solution with stirring, and (4) permitting the resulting composition to cool to ambient temperature.

6. A method of preparing an ink marking composition according to claim 5 in which the acid dye is a sulfonated triarylmethane, the basic dye is a triarylmethane salt and the temperatures of the dye solutions at the time of addition are 165–185° F. for the glycol solution and about boiling temperature for the water solution.

7. A method of preparing an ink marking composition according to claim 5 in which the acid dye is a sulfonated monoazo dye, the basic dye is a diarylmethane salt and the temperatures of the dye solutions at the time of addition are 165–185° F. for the glycol solution and 100–160° F. for the water solution.

8. A method of preparing an ink marking composition according to claim 7 in which the glycol solution is cooled to 120–140° F. for the addition and the water solution is also at 120–140° F.

References Cited

UNITED STATES PATENTS

| | | | |
|---|---|---|---|
| 2,623,827 | 12/1952 | Moos | 106—23 |
| 3,425,779 | 2/1969 | Fisher et al. | 106—22 X |
| 3,468,679 | 9/1969 | Furlotti | 106—22 |
| 3,475,187 | 10/1969 | Kane | 106—22 |
| 3,519,443 | 7/1970 | Kaplan et al. | 106—22 |
| 3,597,244 | 8/1971 | Fookson et al. | 106—22 |

FOREIGN PATENTS

| | | | |
|---|---|---|---|
| 902,110 | 7/1962 | Great Britain | 106—22 |
| 1,062,321 | 3/1967 | Great Britain | 106—22 |

OTHER REFERENCES

Apps, Printing Ink Technology, London, Leonard Hill Limited, Publishers, 1958 TP 949 A6 (p. 178 relied on).

The Naming and Indexing of Chemical Compounds from Chemical Abstracts, QD7.C4, 1962, C.101 (p. 43N, 263 relied on).

JOAN B. EVANS, Primary Examiner

U.S. Cl. X.R.

106—308